US011616382B2

(12) United States Patent
Hale

(10) Patent No.: US 11,616,382 B2
(45) Date of Patent: Mar. 28, 2023

(54) BATTERY MANAGEMENT

(71) Applicant: Johnson Matthey PLC, London (GB)

(72) Inventor: Christopher Hale, Abingdon (GB)

(73) Assignee: Johnson Matthey PLC, London (GB)

( * ) Notice: Subject to any disclaimer, the term of this patent is extended or adjusted under 35 U.S.C. 154(b) by 184 days.

(21) Appl. No.: 16/769,225

(22) PCT Filed: Dec. 6, 2018

(86) PCT No.: PCT/GB2018/053550
§ 371 (c)(1),
(2) Date: Jun. 2, 2020

(87) PCT Pub. No.: WO2019/111008
PCT Pub. Date: Jun. 13, 2019

(65) Prior Publication Data
US 2021/0194264 A1 Jun. 24, 2021

(30) Foreign Application Priority Data
Dec. 6, 2017 (GB) ...................... 1720359

(51) Int. Cl.
H02J 7/04 (2006.01)
H02J 7/16 (2006.01)
H02J 7/00 (2006.01)
H01M 10/0525 (2010.01)
H01M 10/42 (2006.01)
(Continued)

(52) U.S. Cl.
CPC ..... H02J 7/00711 (2020.01); H01M 10/0525 (2013.01); H01M 10/425 (2013.01); H01M 10/44 (2013.01); H01M 10/48 (2013.01); H02J 7/0016 (2013.01); H02J 7/007182 (2020.01); H01M 2010/4271 (2013.01)

(58) Field of Classification Search
USPC ........................ 320/106, 107, 108, 110, 141
See application file for complete search history.

(56) References Cited

U.S. PATENT DOCUMENTS 5,726,554 A   3/1998   Freiman et al.
5,747,969 A   5/1998   Tamai
5,898,294 A   4/1999   Gold
(Continued)

FOREIGN PATENT DOCUMENTS

CN   106654425 A   *   5/2017   ............ H01M 10/44
CN   107146918 A   *   9/2017   ............ H01M 10/44
(Continued)

OTHER PUBLICATIONS

International search report and written opinion of PCT/GB2018/053550 dated Feb. 19, 2019; 10 pages.
(Continued)

Primary Examiner — Brian Ngo
(74) Attorney, Agent, or Firm — BakerHostetler

(57) ABSTRACT

A battery management system for a battery comprising at least one lithium sulphur battery cell. The battery management system comprising: a charging module operable to charge a lithium sulphur battery cell of the battery by delivering a pulsed charging current to the battery cell and to vary the duty cycle of the pulsed charging current so as to reduce the duty cycle of the pulsed charging current during charging of the battery cell.

14 Claims, 3 Drawing Sheets

(51) Int. Cl.
*H01M 10/44* (2006.01)
*H01M 10/48* (2006.01)

(56) References Cited

U.S. PATENT DOCUMENTS

| | | | |
|---|---|---|---|
| 6,229,285 B1 | 5/2001 | Ding | |
| 7,688,075 B2 | 3/2010 | Kelley et al. | |
| 2006/0238203 A1* | 10/2006 | Kelley | G01R 31/389 324/433 |
| 2009/0015207 A1 | 1/2009 | Ibrahim | |
| 2010/0270979 A1* | 10/2010 | Bonkhoff | H02J 7/00 320/145 |

FOREIGN PATENT DOCUMENTS

| | | | | |
|---|---|---|---|---|
| CN | 107146918 A | 9/2017 | | |
| CN | 107069842 A | 8/2018 | | |
| EP | 1473813 A1 | 11/2004 | | |
| EP | 2860842 A1 | 4/2015 | | |
| JP | JH9-7641 A | 10/1997 | | |
| JP | 3005460 B2 | 1/2000 | | |
| JP | 2008252960 A | 10/2008 | | |
| JP | 2008538608 A | 10/2008 | | |
| KR | 20110024707 A * | 3/2011 | | |
| WO | WO 99/09635 A1 | 2/1999 | | |
| WO | 2006115667 A1 | 11/2006 | | |
| WO | WO-2016116437 A1 * | 7/2016 | ............ | H01M 10/44 |
| WO | 2017103617 A1 | 6/2017 | | |
| WO | WO-2017128724 A1 * | 8/2017 | ............ | H01M 10/44 |

OTHER PUBLICATIONS

Combined Search and Examination Report under Sections 17 and 18(3) for Application No. GB1720359.7, dated May 30, 2018; 8 pages.

\* cited by examiner

BATTERY MANAGEMENT

CROSS-REFERENCE TO RELATED APPLICATIONS

This application is a national-stage filing under 37 USC 371(c) of International Application No. PCT/EP2018/053550, file Dec. 6, 2018, which claims priority to, and the benefit of, GB1720359.7, filed Dec. 6, 2017, the entire contents of each of which are herein incorporated by reference in their entirety for all purposes.

FIELD OF THE INVENTION

The present disclosure relates to apparatus and methods for use in a battery comprising at least one battery cell. The apparatus and methods may find particular application in the field of batteries comprising a lithium sulphur battery cell.

BACKGROUND

Rechargeable batteries typically include a plurality of rechargeable battery cells which are designed to undergo successive charge-discharge cycles. The use of such rechargeable batteries, for the purposes of charging them with stored electrochemical energy for later discharge and use is gaining increasing importance in a range of applications. Such applications may, for example, include automotive, marine and other vehicle applications, domestic and uninterruptable energy supplies, and storage of energy produced from intermittent and renewable electricity sources for demand and load levelling in domestic and grid-tied power networks.

A typical battery cell comprises an anode, a cathode and an electrolyte disposed between the anode and cathode. The anode, cathode and electrolyte may be contained within a housing, for example, a pouch. Electrical connections, for example, connection tabs may be coupled to the housing to provide electrical connection with the anode and cathode of the cell.

A typical battery comprises one or more battery cells. In a battery comprising a plurality of battery cells, cells may be coupled in series and/or in parallel, for example, by coupling the electrical connections to an electrical connector. A battery may further include a battery management system for controlling, for example, charging and/or discharging of the battery cells.

One or more battery cells which form a battery may be charged using a suitable charging regime. Typical charging regimes may include constant current and/or constant voltage charging. Constant voltage charging typically involves applying a constant voltage across a battery cell. Constant current charging typically involves applying a variable voltage across a battery cell such that a charging current flowing to the battery cell remains substantially constant. Some types of battery cell (such as a lithium ion battery cell) may typically be charged using a constant current—constant voltage regime. In such a charging regime a constant charging current is supplied to the battery cell until the voltage across the cell approaches a threshold value close to the maximum cell voltage. The charging current is then gradually reduced to maintain the threshold voltage value across the cell (i.e. a constant voltage condition).

A particular type of battery cell which is contemplated herein is a lithium sulphur (Li—S) battery cell. Lithium sulphur is a next generation cell chemistry that, having a theoretical energy density 5 times greater than, for example, lithium ion, may better serve as an electrochemical energy store for a range of applications. A typical lithium-sulphur cell comprises an anode formed from lithium metal or a lithium metal alloy, and a cathode formed from elemental sulphur or other electroactive sulphur material. The sulphur or other electroactive sulphur-containing material may be mixed with an electrically conductive material, such as carbon, to improve its electrical conductivity.

Lithium sulphur battery cells have significantly different voltage and performance characteristics to many other battery cell chemistries (including lithium ion batteries). For example, charging of a lithium ion cell near to its top of charge may be largely dependent on changes in the internal resistance of the cell near to its top of charge. In contrast, to a lithium ion cell, a lithium sulphur cell exhibits a sharp rise in the voltage of the cell at its top of charge and its internal resistance is less of a factor. Furthermore, the voltage behaviour of a lithium sulphur cell during charging may be very different from the voltage behaviour of other cells. Charging regimes used for other battery types (such as lithium ion batteries) may therefore not be suitable for and may be damaging to lithium sulphur battery cells.

SUMMARY OF THE INVENTION

For some battery cells (e.g. lithium sulphur battery cells) continuously charging the battery cell at high states of charge may have disadvantageous effects and may cause damage to the battery cell. For example, lithium sulphur battery cells have been shown to exhibit a so-called shuttle effect during which higher order polysulphides generated at the positive electrode of the battery cell diffuse across the cell to the negative electrode where they are reduced to lower order polysulphides by reaction with metallic lithium. The shuttle effect is a parasitic self-discharge process which has been shown to degrade the capacity and charging efficiency of lithium sulphur cells. The shuttle effect can therefore reduce the useful lifetime of a battery cell.

During charging of a lithium sulphur battery cell, substantial onset of the shuttle effect may occur if a charging current which is delivered to the battery cell falls below a given amount. For example, the shuttle effect has been shown to occur whilst charging lithium sulphur battery cells at charging rates of less than about 0.1 C. Additionally, substantial onset of the shuttle effect may occur during continuous charging of a lithium sulphur battery cell as the cell approaches its maximum state of charge and the voltage across the cell reaches and exceeds a threshold voltage (e.g. about 2.35 V).

In order to reduce the occurrence of the shuttle effect a typical charging regime which may be used to charge a lithium sulphur cell is to deliver a constant charging current to the cell up until the voltage across the cell reaches the threshold voltage, at which point charging is stopped. The constant charging current may be sufficiently high to prevent significant onset of the shuttle effect. For example, the constant charging current may be greater than about 0.1 C. The threshold voltage at which charging of the cell is stopped may be chosen to be lower than a voltage at which significant onset of the shuttle effect is known to occur so as to reduce the occurrence of the shuttle effect. For example, a lithium sulphur battery cell may typically be charged with a constant charging current until the voltage across the battery cell reaches a threshold voltage of about 2.35 V, at which point charging of the battery cell is stopped.

The charging regime which was described above, whilst reducing occurrence of the shuttle effect, prevents a battery cell from being charged to its maximum state of charge, since charging is stopped prior to the maximum state of charge being reached. The full capacity of the battery cell is not therefore utilised and the capacity which is available for discharge is less than the maximum potential capacity of the battery cell.

It has been found that a battery cell may be charged to an increased state of charge whilst avoiding significant onset of the shuttle effect, by delivering a pulsed charging current having a variable duty cycle.

According to a first aspect of the invention there is provided a battery management system for a battery comprising at least one lithium sulphur battery cell, the battery management system comprising: a charging module operable to charge a lithium sulphur battery cell of the battery by delivering a pulsed charging current to the battery cell and to vary the duty cycle of the pulsed charging current so as to reduce the duty cycle of the pulsed charging current during charging of the battery cell.

Delivering a pulsed charging current with a varying duty cycle to a battery cell allows further charge to be delivered to the battery cell whilst reducing damaging effects such as capacity degradation of the battery cell due to the onset of the shuttle effect. The proportion of the maximum potential capacity of the battery cell which can be utilised is therefore increased.

In general, it has been found that delivering a pulsed charging current reduces the onset of the shuttle effect (when compared to an equivalent continuous charging current). In particular, delivering a pulsed charging current allows the voltage across the battery cell to temporarily rise above a threshold voltage (e.g. a voltage at which the shuttle effect may occur, such as about 2.35 V in some cells), in order to deliver further charge to the cell, whilst the time-averaged voltage (e.g. averaged over an entire pulse period or multiple pulse periods) across the cell does not exceed the threshold voltage. Since the time-averaged voltage does not exceed the threshold voltage the onset of the shuttle effect may be advantageously reduced when compared to continuously charging a cell to a voltage in excess of the threshold voltage.

Furthermore, delivering a pulsed charging current allows the charging current during each current pulse to be sufficiently large to reduce any significant onset of the shuttle effect which may result from delivering a low charging current. For example, the charging current may be greater than about 0.1 C during each current pulse. However, since the current is only provided for a fraction of an entire pulse period the time-averaged current may be sufficiently low that the time-averaged voltage across the cell does not exceed the threshold voltage (as was described above).

As was mentioned above, providing a pulsed charging current reduces the time-averaged current when compared to providing the same charging current continuously (i.e. with a duty cycle of 100%). This has also been found to advantageously promote balancing of charge between multiple cells which are connected in series with each other. Some batteries may include a plurality of cells, which are connected in series with each other, which might be referred to as a stack of cells. During use, state of charge differences may develop between different cells in a stack of cells (e.g. due to different cells charging and/or discharging at different rates and/or having different capacities). Such state of charge differences might be reduced by so-called passive balancing, wherein a bypass resistor is connected across one or more cells in the stack. The connection of a bypass resistor across a cell will slow down the charging rate of the cell, relative to other cells in the stack (which do not have a bypass resistor connected across them). One or more bypass resistors may, in particular, be connected across one or more leading cells which are at a higher state of charge than other trailing cells in the stack, so as to allow the trailing cells to catch up with the leading cells during the charge process and to reduce state of charge differences between cells in the stack.

The reduction of state of charge differences between a stack of cells connected in series with other cells using passive balancing as described above, is typically more effective at lower charging currents. However, as was explained above a typical charging regime may include maintaining a substantially constant charging current which is greater than a threshold current (e.g. about 0.1 C). During such a charging regime there may only be a very small time period (during a charging cycle) during which passive balancing between cells connected in series can take place, and in general large bypass resistance values are needed in order to bring about any useful state of charge balancing effects.

As was explained above, by providing a pulsed charging current, the time averaged charging current may be reduced (relative to providing a continuous charging current), particularly as the cells approach the top of charge. Such a period of reduced time-averaged charging current provides an extended time window during which passive balancing between a stack of cells connected in series with each other can be carried out. Furthermore, the resistance values of bypass resistors used in such passive balancing can be reduced (relative, for example, to values which might be used during a constant current charging cycle).

Varying the duty cycle of the pulsed charging current during charging of the battery cell allows the charging current to be adapted to the state of charge of the battery cell. For example, the condition of a battery cell (e.g. the voltage across the cell) may change during charging and may be different at different states of charge. The duty cycle of the charging current may be varied accordingly, so as to adapt the charging current to the condition of the battery cell during charging. In particular, the duty cycle is reduced during charging of the battery cell.

At relatively low states of charge a voltage across the battery cell may be relatively low and may be unlikely to be sufficient for significant onset of the shuttle effect. The battery cell may therefore be provided with a charging current having a relatively high duty cycle (e.g. at or close to 100%) without the time-averaged voltage across the battery cell exceeding a threshold voltage at which significant onset of the shuttle effect might be expected. However, as the state of charge of the battery cell increases during charging, the voltage across the battery cell will also increase and may approach the threshold voltage. The duty cycle of the charging current may therefore be reduced in order to continue to provide charge to the battery cell whilst ensuring that the time-averaged voltage across the battery cell does not exceed the threshold voltage. This allows the battery cell to continue to be charged without causing significant onset of the shuttle effect.

Whilst the invention may find particular use whilst charging a battery cell close to its top of charge, in general a pulsed charging current having a variable duty cycle may be provided at any point during charging and at any state of charge. A pulsed charging current may, for example, be used to reduce a time-averaged charging current when first charging a battery cell after a period of storage and/or during a fast charging regime in order to avoid voltage overshoot effects which might otherwise lead to early termination of charging of the battery cell.

The duty cycle of the pulsed charging current represents the percentage (or fraction) of time during which a current pulse occurs. For example, a duty cycle of 100% corresponds to a continuous current. A duty cycle of 50% corresponds to a current pulse which occurs for 50% of a pulse period. That is, the time interval in between current pulses is the same as the duration of the current pulse. A duty cycle of 20% corresponds to a current pulse which occurs for 20% of a pulse period. That is, the time interval in between current pulses represents 80% of the pulse period. The charging current during different charging current pulses may be substantially the same. The frequency of the pulsed charging current may remain substantially constant or may be varied.

In at least some embodiments, delivering a pulsed charging current to a battery cell comprises delivering pulses of charging current interspersed with periods during which substantially no charging current is delivered to and substantially no discharging current is drawn from the battery cell. That is, each time period of a pulsed charging current may comprise a time period during which a charging current is delivered to the battery cell and a time period during which substantially no current passes through the battery cell.

In some embodiments a battery may include a plurality of battery cells and the charging module may be operable to charge a plurality of battery cells. For example, a battery may include a plurality of battery cells which are connected in series and/or in parallel with each other. The charging current may be provided to one or more of the plurality of battery cells.

The charging module may be arranged to reduce the duty cycle of the pulsed charging current in response to increases in the state of charge of the battery cell.

As was mentioned above, the condition of a battery cell (e.g. the voltage across the cell) may change during charging and be different at different states of charge. For example, at relatively low states of charge the voltage across the battery cell will be relatively low and thus the voltage across the cell is unlikely to be sufficient for significant onset of the shuttle effect to occur. However, at relatively high states of charge the voltage across the battery cell may approach a threshold voltage (e.g. about 2.35 V) above which significant onset of the shuttle effect occurs. The duty cycle of the pulsed charging current may therefore be reduced in response to increases in the state of charge of the battery cell so as to provide a charging current which is suitable for the different condition of the battery cell at different states of charge.

The charging module may be arranged to charge the battery cell with a charging current having a duty cycle of substantially 100% when the state of charge of the battery cell is less than a threshold state of charge.

At states of charge below the threshold state of charge, the voltage across the battery cell may be sufficiently low that a continuous charging current (i.e. a current having a duty cycle of 100%) may be provided to the battery cell without the time-averaged voltage across the battery cell exceeding a threshold voltage beyond which significant onset of the shuttle effect may be expected. The battery cell may therefore be charged with a duty cycle of substantially 100% without significant onset of the shuttle effect. Using a duty cycle of 100% allows the battery cell to be charged relatively quickly (when compared to using a duty cycle of less than 100%).

The charging module may be arranged to charge the battery cell with a pulsed charging current having a duty cycle of less than 100% when the state of charge of the battery cell is greater than the threshold state of charge.

At states of charge which are greater than the threshold state of charge, the voltage across the battery cell may approach a threshold voltage above which significant onset of the shuttle effect may be expected to occur. By reducing the duty cycle of the charging current, the state of charge of the battery cell may continue to be increased whilst a time-averaged voltage of the cell remains at or below the threshold voltage. Reducing the duty cycle of the charging current below 100% may therefore serve to reduce the occurrence of the shuttle effect during continued charging of the battery cell. The battery cell may therefore be charged to close to its maximum capacity without causing significant onset of the shuttle effect.

The charging module may be arranged to vary the duty cycle of the pulsed charging current such that an average voltage across the battery cell does not exceed a threshold voltage.

The average voltage may be a mean voltage across the battery cell during a given time period. For example, the average voltage may be a time-averaged voltage over a full time period of the pulsed charging current. The threshold voltage may be a voltage above which onset of the shuttle effect occurs in a lithium sulphur battery cell. That is, the threshold voltage may represent a threshold below which substantially no occurrence of the shuttle effect occurs in a lithium sulphur cell and above which onset of the shuttle effect does occur. For example, the threshold voltage may be a voltage above which significant onset of the shuttle effect might be expected. For example, the threshold voltage maybe about 2.35 V. However, in general the threshold voltage may be any voltage which is reached at any point during charging of a battery cell.

Varying the duty cycle of the pulsed charging current such that an average voltage across the battery cell does not exceed a threshold voltage may reduce the occurrence of the shuttle effect and therefore reduce any capacity degradation which is caused by the shuttle effect. The voltage across the battery cell may be greater than the threshold voltage at some times during a charging pulse. That is, the voltage across the battery cell may temporarily exceed the threshold voltage during charging. However, by reducing the duty cycle of the pulsed charging current to less than 100%, the average voltage across the battery cell may remain below the threshold voltage. It has been found that if the time-averaged voltage across the battery cell remains below the threshold voltage then significant onset of the shuttle effect is avoided.

The charging module may be arranged to vary the duty cycle of the pulsed charging current such that an average voltage across the battery cell is maintained substantially at a target voltage.

The average voltage may be a mean voltage across the battery cell during a given time period. For example, the average voltage may be a time-averaged voltage over a full time period of the pulsed charging current. For a lithium sulphur cell the target voltage may, for example, be about 2.35 V or less. Maintaining the average voltage across the battery cell substantially at the target voltage may represent an efficient way in which to provide charge to the battery cell without increasing the average voltage across the cell to a voltage at which significant onset of the shuttle effect might occur. The duty cycle might, for example, be progressively decreased as the state of charge of the battery cell increases during charging.

The target voltage may be the same as or less than the threshold voltage.

The charging module may be configured to deliver a pulsed charging current to the battery cell such that the charging current delivered during a charging pulse does not fall below a threshold charging current.

As was explained above, significant onset of the shuttle effect may occur if the battery cell is charged with a relatively low charging current. For example, if the battery cell is charged at a rate of less than about 0.1 C then the shuttle effect may occur. Maintaining the charging current during a charging pulse above the threshold current may therefore reduce or prevent occurrence of the shuttle effect.

As was explained above, during charging of the battery cell the duty cycle of the charging current may be reduced below 100%. This may cause the time-averaged current during a pulse period to decrease below the threshold current. However, the instantaneous charging current during a current pulse may still be greater than the threshold current.

The threshold charging current may be a charging current below which onset of the shuttle effect occurs in a lithium sulphur battery cell. For example, the threshold charging current may represent a threshold above which substantially no occurrence of the shuttle effect occurs in a lithium sulphur cell (until the cell approaches its top of charge, e.g. the cell voltage reaches a threshold voltage) and below which onset of the shuttle effect does occur. The threshold charging current may, for example, be about 0.1 C or less.

Charging currents have been given herein in terms of C-rates. Typically, the onset of the shuttle effect in a battery cell is a function of the rate that the cell is charged in relation to the cell's capacity. A C-rate is a measure of the rate at which a battery cell is charged relative to its maximum capacity. It is therefore a charging current in terms of a C-rate which is relevant when considering the onset of the shuttle effect and which is therefore used herein.

The charging module may be configured to vary the duty cycle of the pulsed charging current in dependence on the age of the battery cell.

As was described above, a pulsed discharge cycle may be used in order to reduce the occurrence of the shuttle effect in a lithium sulphur battery cell. The extent to which the shuttle effect occurs and/or the stage during charging at which onset of the shuttle effect occurs may depend to at least some extent on the age of the battery cell. For example, as a cell ages a shuttle inhibitor in the cell may be diminished such that the shuttle effect occurs to a greater extent and/or occurs earlier in a charge cycle. In order to adapt to changes in the onset of the shuttle effect as a cell ages, the variation of the duty cycle of the pulsed charging current may be controlled in dependence on the age of the battery cell. The age of the battery cell may, for example, correspond to the number charge-discharge cycles to which the cell has been subjected during its lifetime.

In some examples, the duty cycle of the pulsed charging current may be reduced earlier in a charge cycle as a cell ages. For example, a state of charge at which the charging module reduces the duty cycle (e.g. to a given duty cycle) may be less for a cell which has undergone a greater number of charge-discharge cycles in its lifetime (i.e. an older or more aged cell) than for a cell which has undergone a fewer number of charge-discharge cycles (i.e. a newer or less aged cell).

The charging module may be configured to deliver a pulsed charging current to the battery cell and to vary the duty cycle of the pulsed charging current so as to reduce the duty cycle of the pulsed charging current during charging of the battery cell, after the battery cell has been subjected to a threshold number of charge-discharge cycles during its lifetime.

The charging module may be configured to deliver a pulsed charging current to the battery cell as described above (e.g. during which the duty cycle of the pulsed charging current is varied so as to reduce the duty cycle of the pulsed charging current during charging of the battery cell), towards the end of the cycle life of the cell. For example, after the cell has been subjected to a threshold amount of charge-discharge cycles in its life, the cell may subsequently be charged using a pulsed charging regime during which the duty cycle of the pulsed charging current is varied. As was explained above, a variable duty cycle charging current may be used in order to reduce occurrence of the shuttle effect and an older or more aged cell (e.g. having undergone a greater number of charge-discharge cycles in its lifetime) may be more susceptible to the shuttle effect than a younger or less aged cell (e.g. having undergone a fewer number of charge-discharge cycles in its lifetime). Delivering a pulsed charging current and reducing the duty cycle of the pulsed charging current may therefore be more become more applicable as a cell ages.

In some examples, a pulsed charging current (as described above) may only be applied to a cell once the cell has reached a given age. For example, if a number of charge-cycles to which the cell has been subjected during its lifetime reaches a threshold, then the cell may be charged using a pulsed charging current as described above. Before the cell reaches a given age (e.g. when the number of charge-cycles to which the cell has been subjected during its lifetime is less than a threshold number) then the cell may be charged as normal and without delivering a pulsed charging current having a variable duty cycle.

According to a second aspect of the invention there is provided a battery comprising at least one lithium sulphur battery cell and a battery management system according to the first aspect.

According to a third aspect of the invention there is provided a method of charging a battery comprising at least one lithium sulphur battery cell, the method comprising: delivering a pulsed charging current to the lithium sulphur battery cell; and varying the duty cycle of the pulsed charging current so as to reduce the duty cycle of the pulsed charging current during charging of the battery cell.

The duty cycle of the pulsed charging current may be decreased in response to increases in the state of charge of the battery cell.

The method may comprise charging the battery cell with a charging current having a duty cycle of substantially 100% when the state of charge of the battery cell is less than a threshold state of charge.

The method may comprise charging the battery cell with a pulsed charging current having a duty cycle of less than 100% when the state of charge of the battery cell is greater than the threshold state of charge.

The duty cycle of the pulsed charging current may be varied such that an average voltage across the battery cell does not exceed a threshold voltage.

The duty cycle of the pulsed charging current may be varied such that an average voltage across the battery cell is maintained substantially at a target voltage.

The target voltage may be the same as or less than the threshold voltage.

The method may comprise delivering the pulsed charging current to the battery cell such that the charging current delivered during a charging pulse does not fall below a threshold charging current.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF FIGURES

One or more embodiments of the invention are shown schematically, by way of example only, in the accompanying drawings, in which.

DETAILED DESCRIPTION

Before particular examples of the present invention are described, it is to be understood that the present disclosure is not limited to the particular battery management system, battery or method described herein. It is also to be understood that the terminology used herein is used for describing particular examples only and is not intended to limit the scope of the claims.

In describing and claiming the battery management systems, batteries and methods of the present invention, the following terminology will be used: the singular forms "a", "an", and "the" include plural forms unless the context clearly dictates otherwise. Thus, for example, reference to "a battery cell" includes reference to one or more of such elements.

Figure 1:
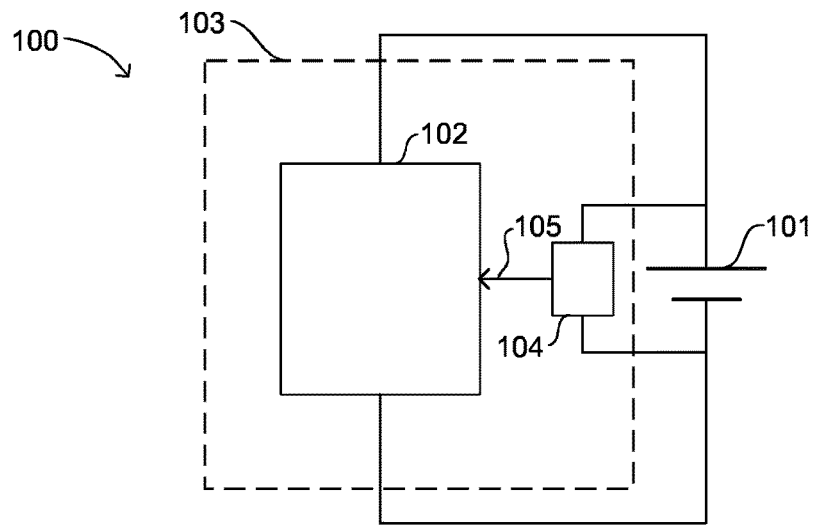
FIG. 1 is a schematic illustration of a battery according to an embodiment of the present invention.

FIG. 1 is a schematic illustration of a battery 100 according to an embodiment of the present invention. The battery 100 comprises a battery cell 101 and a battery management system 103. The battery management system 103 includes a charging module 102 and a cell monitoring module 104. Whilst the battery 100 which is shown in FIG. 1 comprises one battery cell 101, in other embodiments the battery 100 may comprise a plurality of battery cells. For example, a battery 100 may include a plurality of battery cells which are connected in series and/or in parallel with each other. One or more battery cells 101 which form a battery according to embodiments of the invention are rechargeable battery cells and may, for example, comprise a lithium sulphur battery cell.

The charging module 102 is arranged to control charging of the battery cell 101. The charging module 102 may, for example, be connectable to an external power source (e.g. a mains supply) and may be arranged to control a flow of charge from the external power source to the battery cell 101. The charging module 102 may include circuitry or other apparatus arranged to condition power which is supplied to the battery cell 101. For example, the charging module 102 may control a voltage held across the battery cell 101 and/or a charging current flowing to the battery cell 101. The charging module 102 may include apparatus suitable for converting an AC power supply to DC power for supplying to the battery cell 101.

The charging module 102 may include a controller (which may, for example, comprise a processor) for controlling charging of the battery cell 101. For example, the controller may control one or more other components of the charging module 102 so as to control a voltage held across the battery cell 101 and/or a charging current flowing to the battery cell 101. In some embodiments, the controller may be realised at least partly in the form of analogue electronics. For example, the controller may comprise electronic circuitry arranged to control charging of the battery cell 101.

The cell monitoring module 104 is arranged to monitor one or more properties of the battery cell 101. In general, the cell monitoring module 104 may be arranged to measure one or more properties associated with at least one battery cell 101 and may be configured to determine one or more properties of the at least one battery cell 101 based on the measured one or more properties. In the embodiment shown in FIG. 1, the cell monitoring module 104 is connected across the battery cell 101 and may, for example, be arranged to measure the voltage across the battery cell 101. The cell monitoring module 104 may be configured to determine a property of the battery cell 101, such as the state of charge of the battery cell, based on the measured voltage across the cell 101.

Additionally or alternatively, the cell monitoring module 104 may be arranged to monitor a current flowing through the battery cell 101. For example, the cell monitoring module 104 may include apparatus (not shown) connected in series with the battery cell 101 and configured to measure the current flowing through the apparatus.

The cell monitoring module 104 is arranged to provide an input 105 to the charging module 102. The input 105 is indicative of one or more properties of the cell 101, as determined by the cell monitoring module 104. For example, the input 105 may be indicative of the voltage across the battery cell 101 and/or the state of charge of the battery cell 101. Additionally or alternatively, the input 105 may be indicative of the current flowing through the battery cell 101.

The charging module 102 may be configured to control charging of the battery cell 101 based, at least in part, on the input 105 received from the cell monitoring module 104. For example, the charging module 102 may control charging of the battery cell 101 based on at least one of a determination of the voltage across the battery cell 101, the state of charge of the battery cell and/or the current flowing through the battery cell 101.

As was explained above, the battery cell 101 may comprise a lithium sulphur battery cell. Typically, a lithium sulphur battery cell 101 may be charged using a constant current charging regime in which a voltage which is held across the battery cell 101 is varied during charging, such that a substantially constant charging current is delivered to the battery cell 101.

Lithium sulphur battery cells are known to, under some conditions, experience an effect known as the shuttle effect. In a typical lithium sulphur cell, the positive electrode comprises a mixture of e.g. elemental sulphur and carbon supported on metal foil, while the negative electrode is a foil of lithium metal. During discharge, lithium at the negative electrode dissolves as lithium ions and the higher-order polysulphides at the positive electrode are reduced in successive steps to lower-order polysulphides until lithium sulphide is produced. During charging of the cell, lithium ions are reduced at the negative electrode made of lithium metal, and sulphide is re-oxidized to higher-order polysulphides at the positive electrode.

The higher-order polysulphides (which may, for example, include $S_8^{2"}$, $S_6^{2"}$, and $S_4^{2"}$) generated at the positive electrode may be soluble in the electrolyte and can diffuse across the cell to the negative electrode where they are reduced to lower order polysulphides by reaction with metallic lithium. Depending on the state of charge of the cell, the concentration of the different polysulphide species in the cell can vary. The polysulphides are reduced at the lithium electrode then diffuse back to the positive electrode where they are re-oxidized again during charging. This shuttling of the polysulphides between the positive and negative electrode is a parasitic self-discharge process, widely referred to as the "polysulphide shuttle". In addition to self-discharge, the polysulphide shuttle also reduces the cycle life, decreases the charging efficiency, and lowers the power output of the lithium-sulphur cell. This phenomenon may be referred to as the shuttle effect.

It has been shown that significant onset of the shuttle effect may occur during continuous charging of a lithium sulphur battery cell as the cell approaches its maximum state of charge. For example, significant onset of the shuttle effect may occur during continuous charging as the voltage reaches and exceeds a threshold voltage which may be about 2.35 V.

In order to avoid or reduce significant onset of the shuttle effect, a typical constant current charging regime for a lithium sulphur battery cell is terminated when the voltage across the battery cell reaches the threshold voltage. For example, charging may be stopped when the voltage across the battery cell reaches approximately 2.35 V. Whilst such an approach may reduce occurrence of the shuttle effect, termination of charging of the battery cell, once the cell reaches a threshold voltage, prevents the cell from reaching its maximum state of charge. A given fraction of the maximum capacity of the cell therefore goes unused.

Other cell chemistries, such as lithium ion battery cells, may be charged using a constant current—constant voltage charging regime. A constant current-constant voltage charging regime comprises a constant current charging stage followed by a constant voltage charging stage. The constant current stage is similar to the constant current charging regime described above, in which the voltage across a battery cell is varied in order to deliver a substantially constant charging current to the cell. As the cell reaches a threshold voltage, charging is switched to the constant voltage stage during which the charging current is gradually reduced to maintain the voltage of the cell at a maximum charging voltage. The constant voltage charging stage allows charge to continue to be delivered to the cell as the cell approaches its maximum state of charge and therefore increases the charge delivered to the cell (when compared to just using a constant current charging stage) during charging. Consequently, the proportion of the maximum capacity of the cell which is utilised is increased by using a constant voltage charging stage.

A typical constant voltage charging stage may however, cause detrimental effects in a lithium sulphur cell and is therefore not typically used when charging lithium sulphur cells. It has been shown that substantial onset of the shuttle effect may occur in a lithium sulphur cell if a charging current which is delivered to the battery cell falls below a threshold charging current. For example, delivering a charging current of less than about 0.1 C to a lithium sulphur cell may result in significant onset of the shuttle effect. The reduction in charging current which is associated with a constant voltage charging stage can therefore lead to onset of the shuttle effect when used to charge a lithium sulphur cell and is thus typically avoided.

According to embodiments of the invention, the charging module 102 is operable to charge the battery cell 101 by delivering a pulsed charging current to the battery cell 101 and to vary the duty cycle of the pulsed charging current during charging of the battery cell 101.

Figure 2A:
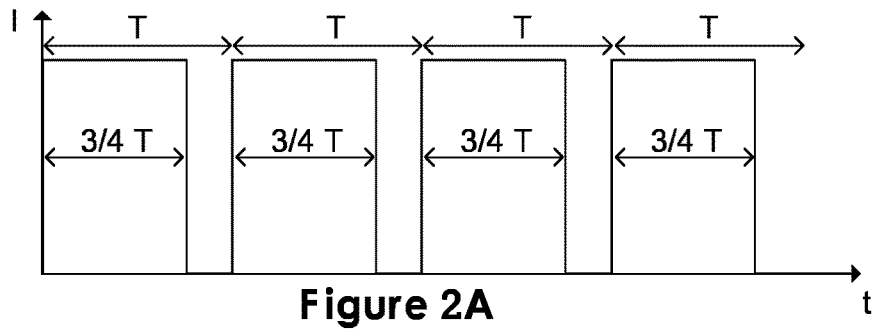
FIGS. 2A-2C are schematic representations of pulsed charging currents having different duty cycles.
Figure 2B:
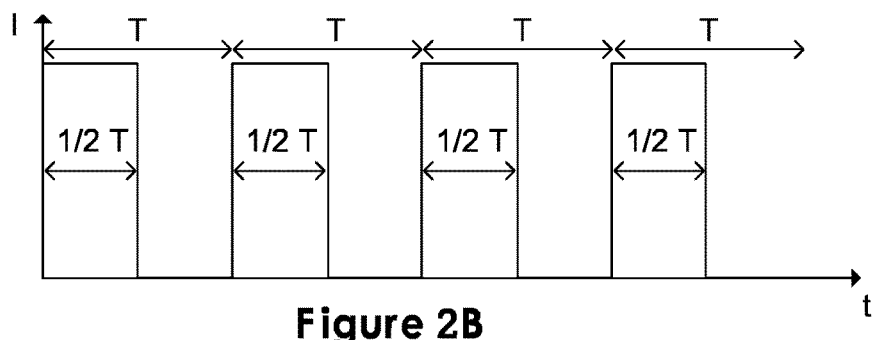
Figure 2C:
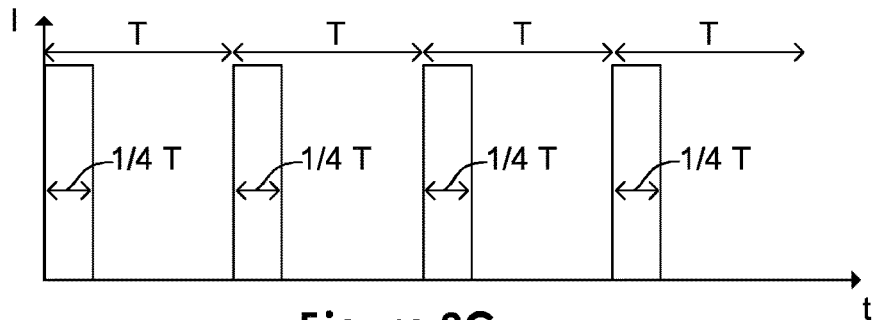

FIGS. 2A-2C are schematic representations of pulsed charging currents having different duty cycles. In each of the representations shown in FIGS. 2A-2C, a charging current I is shown on the vertical axis and time t is shown on the horizontal axis. In each of FIGS. 2A-2C four time periods T of a pulsed charging current are shown. Each time period T includes a pulse of current and a period in between pulses, in which substantially no charging current flows. Typically in the periods between pulses of charging current, substantially no current passes through the battery cell. That is, substantially no charge is provided to or drawn from the battery cell during the time periods between pulses of charging current.

In the representation shown in FIG. 2A each current pulse lasts for approximately three quarters (75%) of the total time period T of the pulsed current. That is, each current pulse lasts for three times the length of the time intervals in between successive pulses (which each last for ¼ T). The duty cycle of a pulsed charging current represents the percentage (or fraction) of time during which current pulses occur. That is, the duty cycle is the percentage (or fraction) of a time period T which is occupied by a current pulse. In the example shown in FIG. 2A the duty cycle is 75% or equivalently three quarters.

In the representation shown in FIG. 2B each current pulse lasts for approximately half (50%) of the total time period T of the pulsed current. That is, each current pulse lasts for the same duration of the length of the time intervals in between successive pulses (which each last for % T). The duty cycle of the pulsed current shown in FIG. 2B is therefore 50% or equivalently a half.

In the representation shown in FIG. 2C each current pulse lasts for approximately one quarter (25%) of the total time period T of the pulsed current. That is, each current pulse lasts for a third of the length of the time intervals in between successive pulses (which each last for % T). The duty cycle of the pulsed current shown in FIG. 2C is therefore 25% or equivalently a quarter.

Whilst three examples of different pulsed currents having different duty cycles are shown in FIGS. 2A-2C, these are presented merely as illustrative examples and different forms of pulsed charging currents may be used. In general, a charging current may be delivered having a duty cycle of anywhere between 0% and 100% (i.e. a constant current).

The charging module 102 is operable to deliver a pulsed charging current to the battery cell 101 and to vary the duty cycle of the pulsed charging current during charging of the battery cell 101. The duty cycle may, for example, be varied in dependence on the voltage or state of charge of the battery cell 101. In particular, the duty cycle may be varied such that the duty cycle decreases during charging.

Using a pulsed charging current may allow the battery cell 101 to continue to be charged after the battery cell has reached a threshold voltage or state of charge at which charging would usually be terminated. For example, as was described above, charging of a lithium sulphur battery cell is typically stopped when the voltage of the cell reaches a threshold voltage (e.g. about 2.35 V), above which continuous charging may result in significant onset of the shuttle effect. However, the use of a pulsed charging current may allow the battery cell 101 to continue to be charged even after the threshold voltage (e.g. about 2.35 V) has been reached.

As was explained above, continuous charging beyond the threshold voltage may result in significant onset of the shuttle effect. However, it has been found that the voltage of the cell may be temporarily raised above the threshold voltage without promoting significant onset of the shuttle effect. In particular, it is thought that if the time-averaged voltage of the cell does not exceed the threshold voltage, then onset of the shuttle effect can at least be reduced and may be substantially avoided.

As was further explained above, delivering a relatively low charging current to a battery cell may result in the onset of the shuttle effect. This can inhibit or prevent the use of relatively small charging currents near the top of charge. By delivering a pulsed charging current, the charging current during each current pulse may be sufficiently large that it does not result in significant onset of the shuttle effect. However, the time-averaged charging current during a full time period T of the pulsed charging current is reduced (when compared to providing the charging current continuously). The time-averaged charging current may therefore be reduced, for example, as the battery cell approaches its top of charge, without the instantaneous charging current being low enough to induce significant onset of the shuttle effect.

The charging module 102 may be configured to deliver a pulsed charging current to the battery cell 101 such that the charging current which is delivered during a charging pulse does not fall below a threshold charging current. However, the duty cycle of the pulsed charging current may be reduced such that the time-averaged charging current can be reduced below the threshold current. The threshold current may represent a charging current below which significant onset of the shuttle effect might be expected. The threshold charging current may, for example, be about 0.1 C.

Charging currents are given herein in terms of C-rates, which represent a measure of the rate at which a battery cell is charged relative to its maximum capacity. Typically, the onset of the shuttle effect in a battery cell is a function of the rate that the cell is charged in relation to the cell's capacity. A charging current in terms of a C-rate is therefore the relevant quantity when considering the onset of the shuttle effect and is accordingly used herein. It will be appreciated that a given C-rate will correspond to different charging currents in Amps when considering battery cells having different capacities.

For the reasons explained above, delivering a pulsed charging current to a battery cell 101 allows further charge to be delivered to the battery cell 101 whilst reducing damaging effects such as capacity degradation of the battery cell due to the onset of the shuttle effect. The proportion of the maximum potential capacity of the battery cell 101 which can be utilised is therefore increased.

Varying the duty cycle of the pulsed charging current during charging of the battery cell 101 allows the charging current to be adapted during different stages of charging of the battery cell 101 and as the state of charge of the cell changes. For example, the condition of a battery cell 101 (e.g. the voltage across the cell) may change during charging and may be different at different states of charge. The duty cycle of the charging current may be varied accordingly, so as to adapt the charging current to the condition of the battery cell 101 during charging. In particular, the duty cycle of the charging current may be reduced during charging.

The charging module 102 may be configured to vary the duty cycle of a pulsed charging current, provided to the battery cell 101 in response to changes in the state of charge of the battery cell 101. The state of charge of the battery cell 101 may, for example, be determined by the cell monitoring module 104 and may be communicated to the charging module 102 via the input 105 which may be indicative of the state of charge of the battery cell 101. The state of charge of the battery cell 101 may, for example, be determined in dependence on a voltage measured across the battery cell 101. In some embodiments, the state of charge of the battery cell 101 may be determined by measuring one or more properties of the cell (e.g. the cell voltage) at different times during charging and using multiple measurements taken at different times to determine the state of charge.

At relatively low states of charge, the voltage of the battery cell 101 will also typically be relatively low. The voltage will therefore be unlikely to be sufficient for significant onset of the shuttle effect to occur. However, as the state of charge of the battery cell 101 increases towards the maximum state of charge of the cell, the voltage of the cell also tends to increase. As the cell 101 approaches its maximum state of charge, the voltage of the cell will approach a threshold voltage (e.g. about 2.35 V) at which significant onset of the shuttle effect may occur. The duty cycle of the charging current which is provided to the battery cell 101, may be varied at different stages during a charging cycle so as to provide a duty cycle which is appropriate to the state of charge and voltage of the cell 101.

The duty cycle of the charging current may be reduced as the state of charge of the battery cell 101 increases. As was explained above, the voltage of the cell 101 may be relatively low at relatively low states of charge. The duty cycle used to charge the cell 101 may therefore be relatively high without the voltage of the cell increasing above the threshold voltage at which significant onset of the shuttle effect occurs. For example, a duty cycle of at or close to 100% may be used at relatively low states of charge. That is, the charging module 102 may charge the battery cell 101 with a charging current having a duty cycle of substantially 100% when the state of charge of the battery cell 101 is less than a threshold state of charge.

A charging current having a duty cycle of 100% is a continuous current and may, for example, be provided as a substantially constant current. That is, a constant current charging regime may be used until the state of charge of the cell 101 reaches a threshold state of charge. A continuous or constant charging current in general allows the battery cell 101 to be charged relatively quickly (when compared to using a duty cycle of less than 100%).

At states of charge which are less than the threshold state of charge, a charging current of 100% may be delivered to the battery cell 101 without the voltage of the cell exceeding a threshold voltage at which significant onset of the shuttle effect might be expected to occur. However, as the state of charge of the battery cell 101 reaches and exceeds the threshold state of charge, further charging of the cell may cause the instantaneous voltage of the cell 101 to exceed the threshold voltage. The duty cycle of the charging current may therefore be reduced to less than 100% when the state of charge reaches the threshold state of charge. That is, a pulsed charging current (having a duty cycle of less than 100%) may be provided to the battery cell 101 when the state of charge of the cell exceeds the threshold state of charge. This allows charging of the battery cell 101 to be continued whilst keeping the time-averaged voltage of the cell at or below the threshold voltage. Occurrence of the shuttle effect may therefore be reduced or eliminated during continued charging of the cell 101.

Providing the battery cell 101 with a pulsed charging current having a duty cycle of less than 100% when the state of charge is greater than the threshold state of charge allows charging of the cell to be continued (when it might otherwise be stopped when using a continuous charging current) and without causing significant onset of the shuttle effect. The state of charge of the cell may therefore be further increased relative to using typical charging regimes (comprising a constant current charging stage only) and the proportion of the maximum potential capacity of the battery cell which can be utilised is increased.

In some embodiments, the charging module 102 may be configured to vary the duty cycle of the pulsed charging current such that the time-averaged voltage of the cell 101 does not exceed the threshold voltage. The voltage of the cell may be greater than the threshold voltage at some times during a charging pulse such that the voltage of the cell temporarily exceeds the threshold voltage. However, by reducing the duty cycle of the pulsed charging current, the time-averaged voltage of the cell during each pulse period T may be less than or substantially equal to the threshold voltage.

In some embodiments, the charging module 102 may be configured to vary the duty cycle of the pulsed charging current such that the time-averaged voltage of the battery cell is maintained substantially at a target voltage during at least some parts of a charging cycle. For example, once the state of charge of the cell 101 exceeds the threshold state of charge and continuous charging of the cell 101 is replaced with a pulsed charging current, the duty cycle may be varied so as to maintain the time-averaged voltage of the cell 101 substantially at a target voltage.

For a lithium sulphur battery cell 101, the target voltage may, in some embodiments, be approximately 2.35 V or less. In some embodiments, the target voltage may be approximately the same as the threshold voltage (which may be about 2.35 V). In general, the target voltage may be substantially the same as or less than the threshold voltage.

Figure 3:
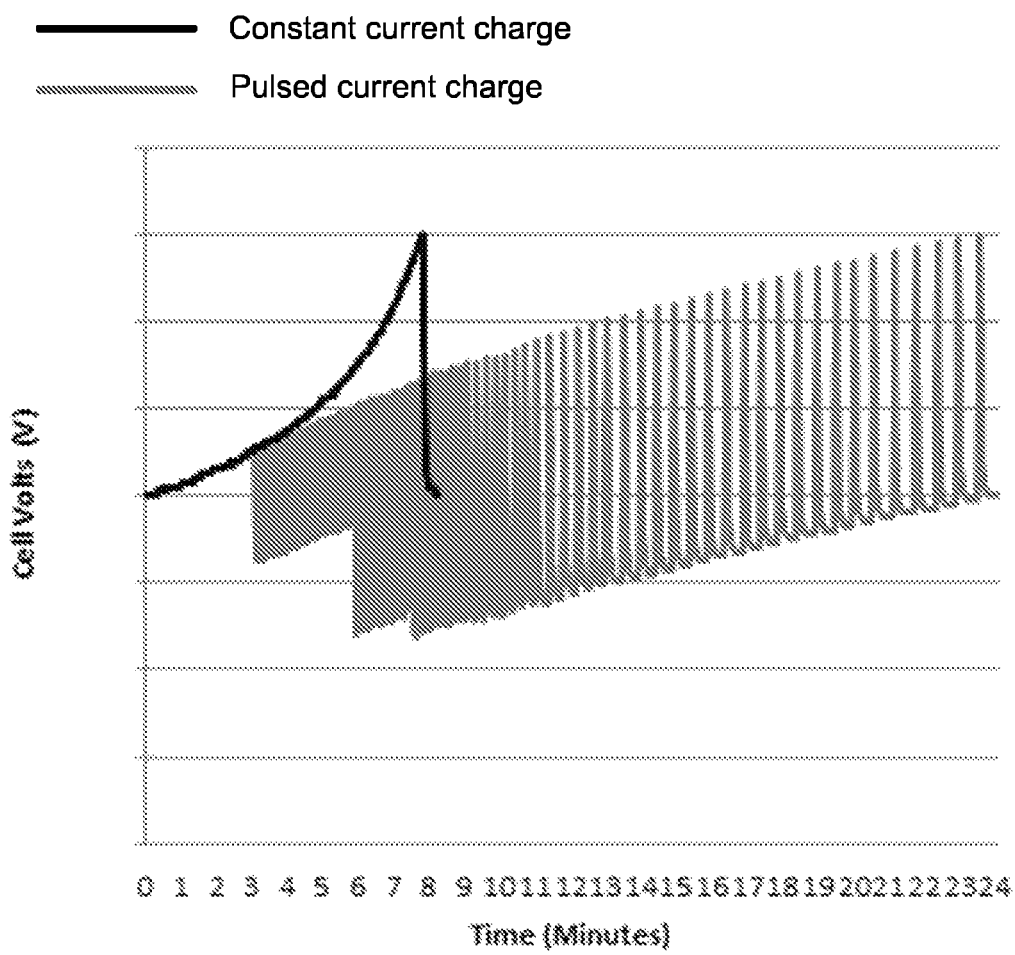
FIG. 3 is a schematic representation of the voltage of a cell during charging with a constant current and with a pulsed current.

FIG. 3 is a schematic representation of the voltage of a battery cell as a function of time whilst charging the cell near to its top of charge. That is, the cell represented in FIG. 3 has a state of charge close to its maximum state of charge. The solid black line in FIG. 3 represents the voltage of the cell whilst undergoing constant current charging at a charge rate of about 0.2 C. The solid grey line in FIG. 3 represents the voltage of the cell whilst being subjected to a pulsed charging current having a variable duty cycle. The charge pulses of the pulsed charging current have a charge rate of approximately 0.2 C. However, since the pulsed charging current has a duty cycle of less than 100%, the time-averaged voltage of the cell may remain at or below a threshold voltage at which significant onset of the shuttle effect may occur.

As can be seen in FIG. 3, during continuous charging of the battery cell (as represented by the black line in FIG. 3) the voltage of the cell monotonically increases until charging is stopped. As charging is stopped, the voltage settles to an end of charge voltage which is less than the voltage reached during charging. The continuous charging which is shown in FIG. 3 represents a situation in which continuous charging of the battery cell is carried out after a threshold voltage of the cell has been reached. The continuous charging which is shown in FIG. 3 may therefore result in significant onset of the shuttle effect and consequently may cause degradation of the capacity and/or the charging efficiency of the cell.

As can be seen in FIG. 3, the duty cycle of the pulsed charging current (represented by the grey line in FIG. 3) varies during charging. In particular, the duty cycle is decreased during charging and as the voltage and the state of charge of the cell increases. By decreasing the duty cycle of the pulsed charging current the time-averaged voltage of the cell may be maintained substantially at a target voltage even as the peak voltage during current pulses increases during charging. Further charging of the battery cell can therefore be carried out without significant onset of the shuttle effect in the cell 101.

Comparing the constant current charging and the pulsed current charging shown in FIG. 3, the battery cell is charged to approximately the same state of charge using both regimes. However, significant onset of the shuttle effect is likely to occur as a result of performing the constant current charging shown in FIG. 3. The pulsed current charging regime shown in FIG. 3 results in a reduction in the onset of the shuttle effect (when compared to the constant current charging) whilst still charging the battery cell to approximately the same state of charge.

The pulsed current charging could be continued beyond the point shown in FIG. 3 in order to further increase the state of charge of the battery cell 101 by further decreasing the duty cycle of the charging current.

In the embodiment shown in FIG. 1, the battery 100 includes a single battery cell 101. However, in other embodiments the battery 100 may include a plurality of battery cells.

Figure 4:
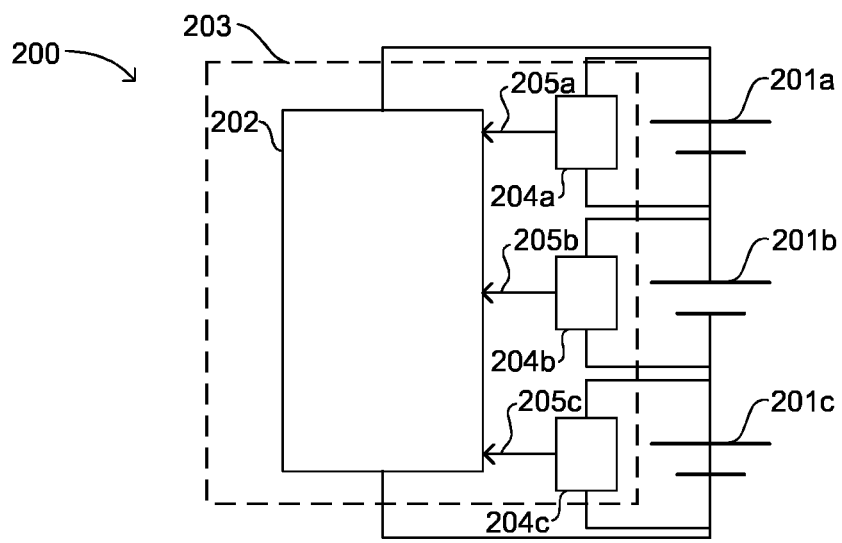
FIG. 4 is a schematic illustration of a battery according to a further embodiment of the invention.

FIG. 4 is a schematic illustration of a battery 200 according to an embodiment of the invention and including a plurality of battery cells 201a-201c. The battery 200 comprises a battery management system 203 and a plurality of battery cells 201a-201c. In the embodiment shown in FIG. 4 the cells 201a-201c are connected in series with each other. The battery management system 203 comprises a charging module 202 and cell monitoring modules 204a-204c

Each cell monitoring module 204a-204c is associated with a respective battery cell 201a-201c. The cell monitoring modules 204a-204c may be equivalent to the cell monitoring module 104 described above with reference to FIG. 1. That is, the cell monitoring modules 204a-204c may be arranged to monitor one or more properties of the battery cells 204a-204c. For example, the cell monitoring modules 204a-204c may be arranged to measure and/or determine the voltage of the cells 204a-204c, the state of charge of the cells 204a-204c and/or the current flowing through the cells 204a-204c. The cell monitoring modules 204a-204c provide respective inputs 205a-205c to the charging module 202.

The charging module 202 may control charging of the cells 201a-201c in dependence on the inputs 205a-205c received from the cell monitoring modules 204a-204c. Charging of the cells 201a-201c may be equivalent to the charging described above with respect to the embodiment shown in FIG. 1 and will not be described in extensive detail in connection with FIG. 4. In general, the charging module 202 is configured to charge the cells 201a-201c by delivering a pulsed charging current to the cells 201a-201c. The charging module 202 is further configured to vary the duty cycle of the pulsed charging current during charging of the cells 201a-201c. For example, as was described above with reference to the embodiment shown in FIG. 1, the duty cycle of the pulsed charging current may be reduced during charging so as to allow further charging of the cells 201a-201c without causing significant onset of the shuttle effect.

Figure 5:
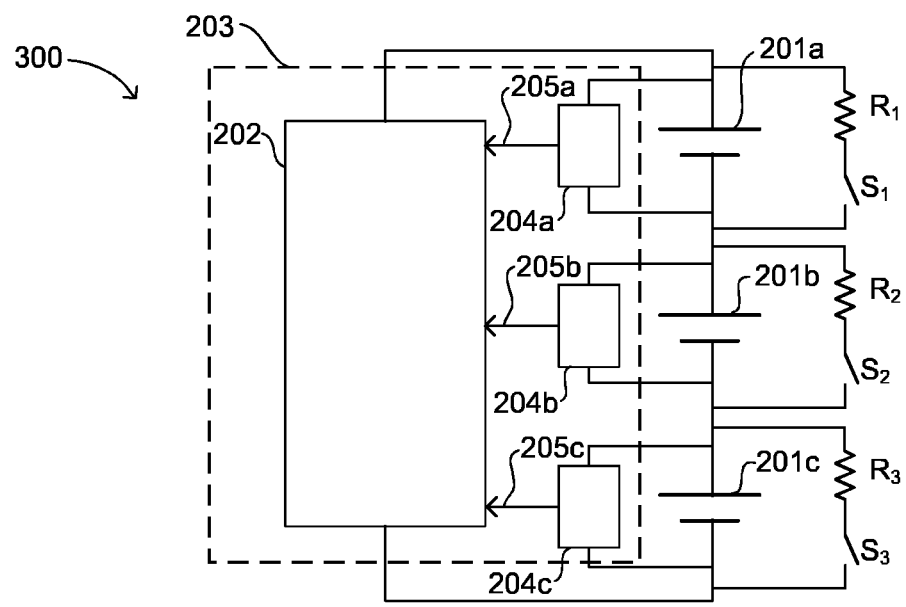
FIG. 5 is a schematic illustration of a battery according to a still further embodiment of the invention.

FIG. 5 is schematic illustration of a battery 300 according to a further embodiment of the invention. The battery 300 shown in FIG. 5 is same as the battery 200 shown in FIG. 4 except for the addition of some extra components. Like components in the embodiment shown in FIG. 5 have like reference numerals to equivalent components of the embodiment shown in FIG. 4 and will not be described in any more detail with reference to FIG. 5.

The battery 300, which is shown in FIG. 5 additionally includes resistors $R_1$-$R_3$ connected across the cells 201a-201c respectively. The resistors $R_1$-$R_3$ are connected via switches $S_1$-$S_3$. The switches $S_1$-$S_3$ are operable to be opened and closed so as to connect and disconnect the resistors $R_1$-$R_3$ across the cells 201a-201c.

The resistors $R_1$-$R_3$ may be referred to as bypass resistors. One or more of the bypass resistors $R_1$-$R_3$ may be selectively connected across one or more of the cells 201a-201c in order to bypass some of the charging current provided by the charging module 202 through the one or more bypass resistors $R_1$-$R_3$. A bypass resistor $R_1$-$R_3$ may therefore be connected across a cell 201a-201c in order to reduce the charging current provided to the cell 201a-201c.

The bypass resistors may be selectively connected and disconnected in order to balance the state of charge of the cells 201a-201c. During use state of charge differences may develop between the cells 201a-201c. For example, the cells 201a-201c may charge and/or discharge at slightly different rates during use and/or may have slightly different capacities which lead to the development of state of charge differences between the cells 201a-201c.

State of charge differences between the cells 201a-201c may disadvantageously reduce the available capacity of the cells which can be utilised. For example, charging of the cells 201a-201c may be stopped when the cell having the highest state of charge reaches its top of charge. However, the remaining cells may not yet be fully charged and thus charging of these cells is stopped before their reach their maximum potential capacity. Similarly, discharging of the cells is stopped when the first cell becomes fully discharged, however, the remaining cells may still have some capacity which cannot then be discharged and utilised.

It may therefore be desirable to balance the state of charge of the cells 201a-201c so as to reduce state of charge differences between the cells 201a-201c. The state of charge of the cells 201a-201c may be balanced by connecting a bypass resistor $R_1$-$R_3$ across the cell having the greatest state of charge (which may be referred to as the leading cell), during charging. Connection of the bypass resistor will divert some of the charging current away from the leading cell, thereby slowing down the rate at which the leading cell is charged. The other cells will be charged at a faster rate than the leading cell and thus the state of charge differences between the cells can be reduced.

One or more bypass resistors $R_1$-$R_3$ may be connected across one or more of the cells 201a-201c in dependence on determinations of the state of charge of the cells, as made by the cell monitoring modules 204a-204c. For example, the charging module 202 may control the switches $S_1$-$S_3$ in dependence on the inputs 205a-205c received from the cell monitoring modules 204a-204c.

Due to the resistance characteristics of the cells 205a-205c the proportion of the charging current which is bypassed through a connected bypass resistor $R_1$-$R_3$ is typically larger at smaller charging currents. State of charge differences can therefore be more effectively reduced by connection of a bypass resistor when the charging current delivered to the cells 205a-205c is relatively low.

During a typical constant current charging regime, which might be used, for example, to charge lithium sulphur cells, the charging current is maintained at a relatively high current. There is therefore only a very limited time during such a charging cycle during which cell balancing using bypass resistors is effective. Relatively large bypass resistance values may therefore be needed in order to deliver any effective balancing between the cells in this short time period.

Delivering a pulsed charging current of variable duty cycle, as was described above, advantageously increases a time period during a charge cycle during which effective cell balancing may be carried out. As was explained above, as the state of charge of the cells increases, the duty cycle of the charging current is reduced thereby causing a reduction in the time-averaged charging current. Such a reduction in the time-averaged charging current increases the proportion of charging current which can be diverted through a bypass resistor $R_1$-$R_3$, thereby improving the effectiveness with which cell balancing can be performed. This may advantageously allow bypass resistors $R_1$-$R_3$ having smaller resistances to be used whilst still delivering effective cell balancing.

Whilst the embodiments shown in FIGS. 4 and 5 include three cells connected in series with each other, it will be appreciated that other embodiments may include different numbers of cells. For example, some embodiments may include at least some cells which are connected in parallel with other. In general, batteries according to embodiments of the invention may include any number of cells. In embodiments in which the battery includes a plurality of cells, the cells may be arranged in series with each other, in parallel with each or may include a combination of series and parallel connections between cells.

Embodiments have been described above in which a pulsed charging current is provided to a battery cell and in which a duty cycle of the pulsed charging current is varied so as to reduce the duty cycle of the pulsed charging current during charging of the battery cell. This has been described in the context of reducing a time-averaged charging current during charging of a battery cell near to its top of charge. In particular, embodiments have been described in which the duty cycle of a pulsed charging current is reduced during charging such that a time-averaged voltage of the battery cell does not exceed a threshold voltage, where the threshold voltage is a voltage above which onset of the shuttle effect might be expected.

In some embodiments, a pulsed charging current having a duty cycle which is reduced during charging, may be provided at other points during charging of a battery cell. For example, a pulsed charging current having a variable duty cycle may be provided at the start of charging of a battery cell. In some situations, for example when first charging a cell after a period of storage, the voltage of the cell may increase relatively rapidly during initial charging of the cell. This may be referred to as a voltage overshoot of the cell. Voltage overshoot may additionally or alternatively occur during fast charging of a cell.

Voltage overshoot may cause charging of the cell to be terminated early. For example, as was described above, charging of the cell may be stopped when the voltage of the cell reaches or exceeds a given voltage. The given voltage may be caused by voltage overshoot even when the state of charge of the cell is significantly lower than the maximum state of charge of the cell. Charging of the battery cell may therefore be terminated before the battery cell is fully charged.

In some embodiments, voltage overshoot may be reduced or mitigated by providing a pulsed charging current having a duty cycle which is varied such that an average voltage across the battery cell does not exceed a threshold voltage. A time-averaged charging current will therefore be reduced (by reducing the duty cycle of a pulsed charging current) in order to prevent the voltage of the cell from exceeding the threshold voltage.

In general, any threshold voltage may be used and a pulsed charging current having a variable duty cycle, which is reduced during charging, may be provided to a cell at any state of charge of the cell and during anytime during charging of the cell.

Features, integers, characteristics, compounds, chemical moieties or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed.

The invention claimed is:

1. A battery comprising at least one lithium sulphur battery cell and a battery management system for the battery, the battery management system comprising:
   a charging module operable to charge a lithium sulphur battery cell of the battery by delivering a pulsed charging current to the battery cell and to vary the duty cycle of the pulsed charging current so as to reduce the duty cycle of the pulsed charging current during charging of the battery cell,
   wherein the charging module is arranged to vary the duty cycle of the pulsed charging current such that a time-average voltage across the battery cell does not exceed a threshold voltage, wherein the threshold voltage is a voltage above which onset of a shuttle effect occurs in the lithium sulphur battery cell.

2. The battery and battery management system of claim 1, wherein the charging module is arranged to reduce the duty cycle of the pulsed charging current in response to increases in the state of charge of the battery cell.

3. The battery and battery management system of claim 1, wherein the charging module is arranged to charge the battery cell with a charging current having a duty cycle of substantially 100% when the state of charge of the battery cell is less than a threshold state of charge.

4. The battery and battery management system of claim 3, wherein the charging module is arranged to charge the battery cell with a pulsed charging current having a duty cycle of less than 100% when the state of charge of the battery cell is greater than the threshold state of charge.

5. The battery and battery management system of claim 1, wherein the charging module is arranged to vary the duty cycle of the pulsed charging current such that an average voltage across the battery cell is maintained substantially at a target voltage.

6. The battery and battery management system of claim 5, wherein the target voltage is the same as or less than the threshold voltage.

7. The battery and battery management system of claim 1, wherein the charging module is configured to deliver a pulsed charging current to the battery cell such that the charging current delivered during a charging pulse does not fall below a threshold charging current.

8. A method of charging a battery comprising at least one lithium sulphur battery cell, the method comprising:
   delivering a pulsed charging current to the lithium sulphur battery cell; and varying the duty cycle of the pulsed charging current so as to reduce the duty cycle of the pulsed charging current during charging of the battery cell,
   wherein the duty cycle of the pulsed charging current is varied such that a time-average voltage across the battery cell does not exceed a threshold voltage, wherein the threshold voltage is a voltage above which onset of a shuttle effect occurs in the lithium sulphur battery cell.

9. The method of claim 8, wherein the duty cycle of the pulsed charging current is decreased in response to increases in the state of charge of the battery cell.

10. The method of claim 8, comprising charging the battery cell with a charging current having a duty cycle of substantially 100% when the state of charge of the battery cell is less than a threshold state of charge.

11. The method of claim 10, comprising charging the battery cell with a pulsed charging current having a duty cycle of less than 100% when the state of charge of the battery cell is greater than the threshold state of charge.

12. The method of claim 8, wherein the duty cycle of the pulsed charging current is varied such that an average voltage across the battery cell is maintained substantially at a target voltage.

13. The method of claim 12, wherein the target voltage is the same as or less than the threshold voltage.

14. The method of claim 8, wherein comprising delivering the pulsed charging current to the battery cell such that the charging current delivered during a charging pulse does not fall below a threshold charging current.

* * * * *